Figure 1:
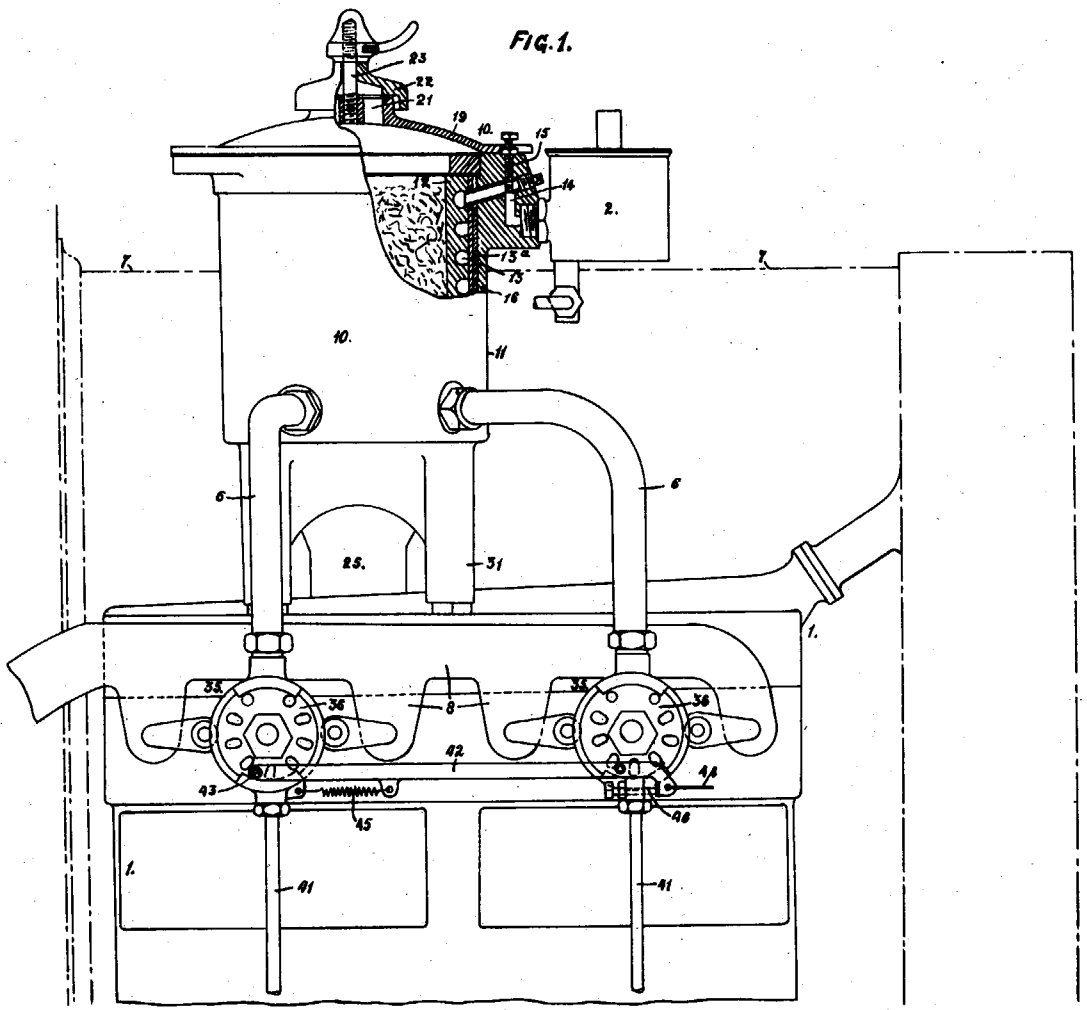

P. O. ROWLANDS.

APPARATUS FOR VAPORIZING HYDROCARBONS.

APPLICATION FILED MAY 28, 1919.

Reissued July 12, 1921. 15,153.

3 SHEETS—SHEET 1.

INVENTOR.

P. O. Rowlands.

By Jur Stuart Atty.

P. O. ROWLANDS.

APPARATUS FOR VAPORIZING HYDROCARBONS.

APPLICATION FILED MAY 28, 1919.

Reissued July 12, 1921. 15,153.

3 SHEETS—SHEET 2.

INVENTOR.

P. O. Rowlands.

by Jas. Tennel

Atty.

P. O. ROWLANDS.

APPARATUS FOR VAPORIZING HYDROCARBONS.

APPLICATION FILED MAY 28, 1919.

Reissued July 12, 1921. 15,153.

3 SHEETS—SHEET 3.

INVENTOR.

P. O. Rowlands.

by [signature]

Atty.

UNITED STATES PATENT OFFICE.

PERCY OCTAVIUS ROWLANDS, OF LIVERPOOL, ENGLAND.

APPARATUS FOR VAPORIZING HYDROCARBONS.

15,153. Specification of Reissued Letters Patent. Reissued July 12, 1921.

Original No. 1,252,955, dated January 8, 1918, Serial No. 158,947, filed March 31, 1917. Application for reissue filed May 28, 1919. Serial No. 300,447.

*To all whom it may concern:*

Be it known that I, PERCY OCTAVIUS ROWLANDS, a subject of the King of England, residing at Liverpool, in the county of Lancaster, England, have invented new and useful Improvements in Apparatus for Vaporizing Hydrocarbons, of which the following is a specification.

This invention has reference to the vaporization of liquid hydrocarbon and more particularly such as have a greater specific gravity than a spirit, as petrol, alcohol, or the like—for use primarily as a power-fuel in internal combustion engines; and to vaporizing apparatus used on such engines therefor.

The object of the invention is, mainly to render the use of hydro-carbon liquids of the character referred to, for producing power in motors of self-propelled vehicles or navigable vessels (or under analogous conditions) free of difficulties or draw-backs such as at present exist in connection with its use in such motors; and also to render its use generally more convenient and advantageous; but at the same time it is to be understood that the manner of effecting vaporization of such liquid hydro-carbons, and the apparatus employed as hereinafter described, can be used with advantage in connection with stationary internal combustion engines.

In carrying out this invention, the vaporization of liquid hydro-carbon of the character of mineral "oil" such as kerosene (and which for convenience hereafter will be designited "kerosene") is effected by heat generated by the slow and requlated combustion of solid fuel—such, for instance, as charcoal, anthracite, or coke—within a chamber or receptacle into which and through which the kerosene is conducted by ducts, say of coil, zig-zag, or other suitable form, the heat produced being transmitted to the kerosene through the wall of the duct or ducts, and the fuel or its products of combustion are not necessarily brought into contact with the kerosene.

The invention consists therefore, in an internal combustion engine, in which a hydro-carbon liquid fuel of the character described is employed, of effecting its conversion to vapor, in a vaporizing appliance or apparatus combined or connected with the engine or motor, by heating it by the combustion of solid fuel within said appliance or apparatus, the heat of which is transmitted to the liquid through the wall of a conduit or chamber into or through which it is conducted, and without necessarily coming in direct contact with the solid fuel or the products of combustion thereof.

The drawings which are used to illustrate this invention, show its application to a common type of four cylinder oil engine used on "self-propelled" vehicles, which is assumed to be disposed at the fore part of the vehicle, and inclosed within a casing or "bonnet", as usual.

Figure 2:
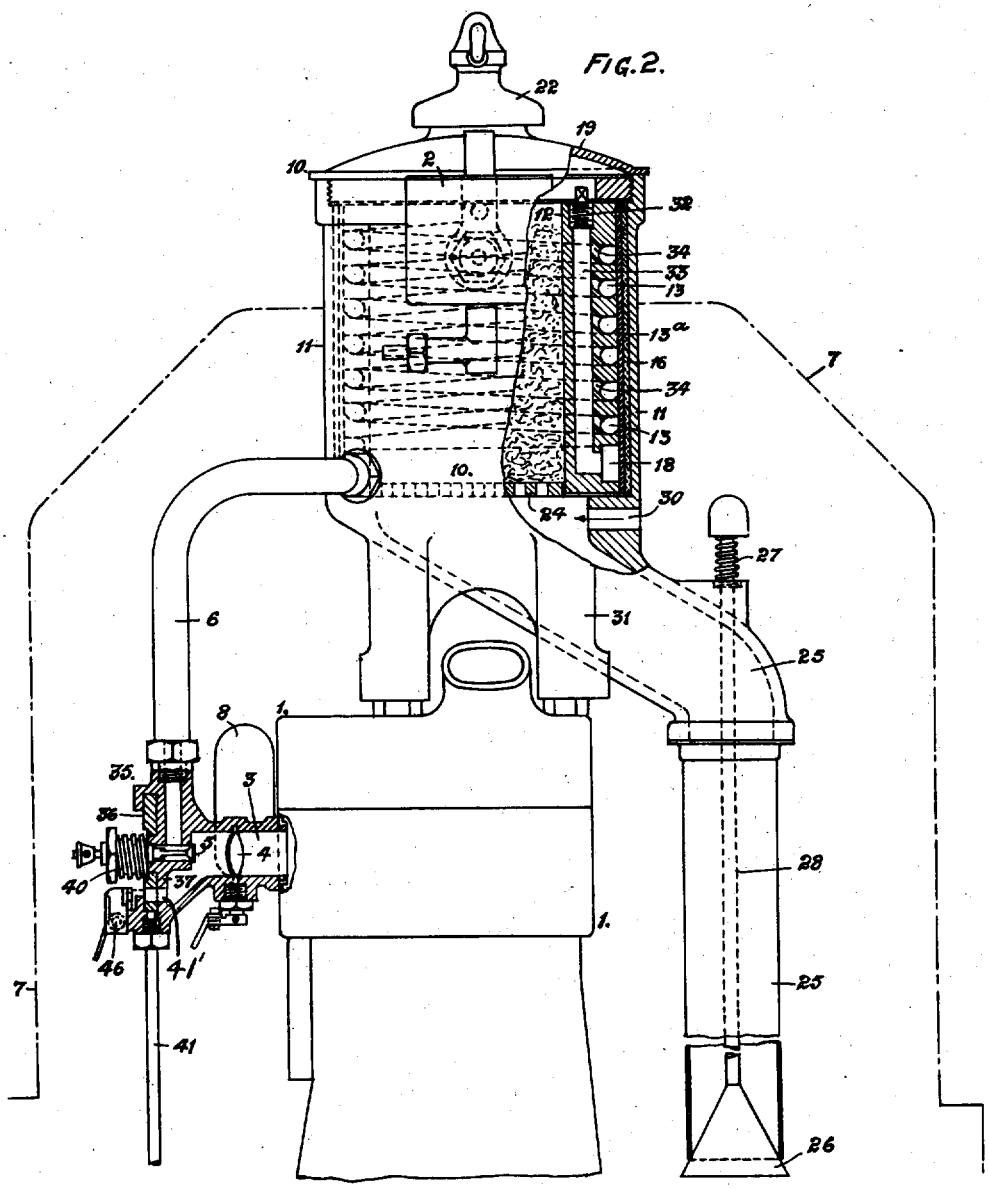
Figure 3:
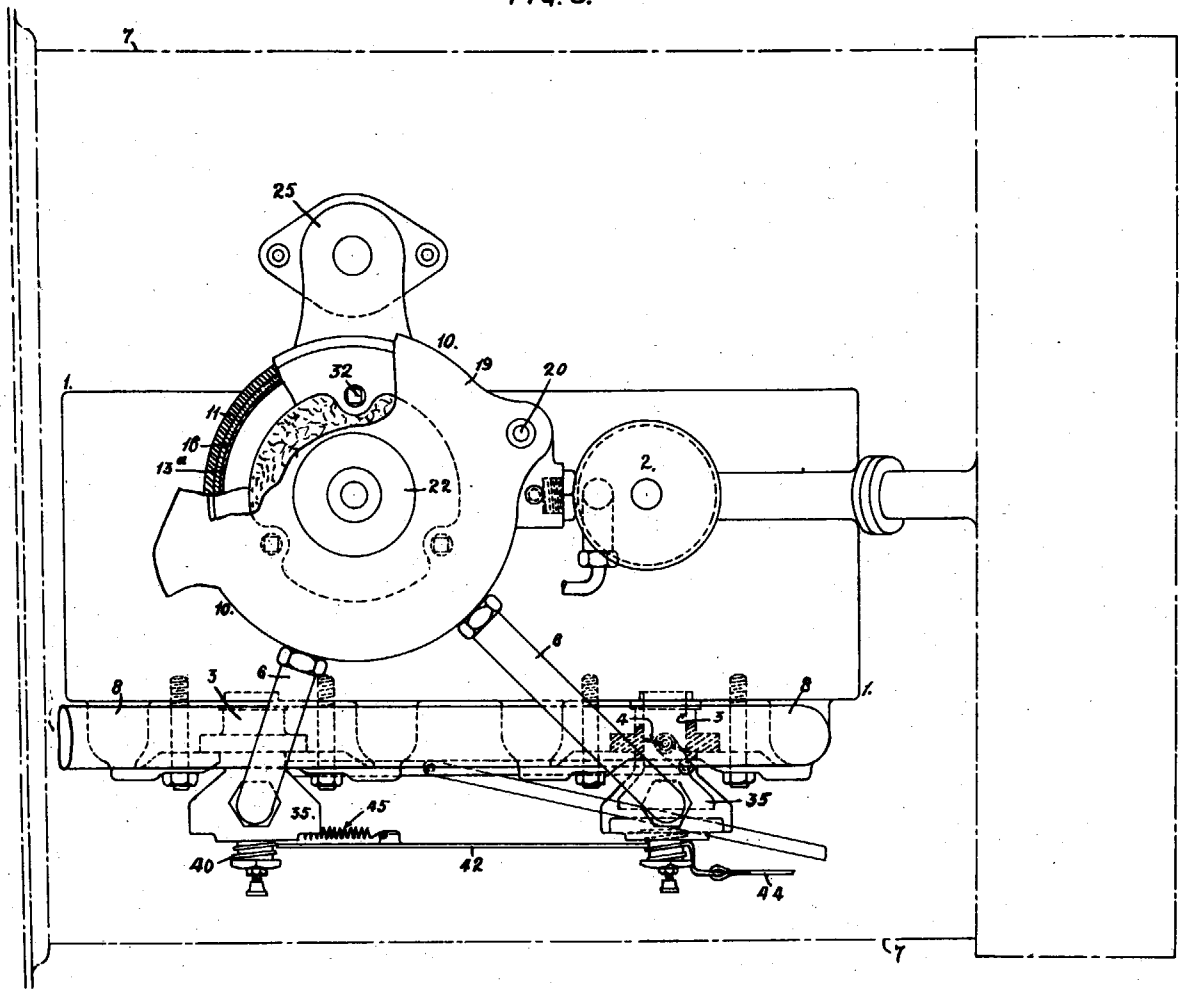

In these drawings, Figure 1 is a longitudinal elevation, Fig. 2 is an end view partly in section, and Fig. 3 a plan showing the engine and its vaporizer.

Referring to the drawings, 1 generally represents the engine or motor, and 10 the vaporizing apparatus, 2 is the paraffin supply regulating device, say of the "float" type; 3 designates two air and vapor inlet conduits to the engine, each of which has within it a throttle valve 4; 5 is the vapor inlet controlled valve connected with the inlet conduit 3; and 6 is a conduit or pipe connecting the vaporizer with the conduit 3 and engine.

7 is the "bonnet" within which the engine is disposed, and out of which the top of the vaporizer 10 projects.

The vaporizer chamber or apparatus in the case shown, comprises an external chamber or vessel 11 proper, an internal metal cylinder or liner 12, having within it the spiral kerosene conducting tube or way 13, to the upper end of which the paraffin from the supply controlling device 2 is delivered through the duct or port 14, which has upon it a supply regulating screw plug 15.

The duct or way 13, is open on the exterior of the cylinder 12; and has a metal covering sleeve $13^a$; and between this sleeve and the interior of the vessel 11, an asbestos or other equivalent heat non-conducting wall 16 is introduced, to prevent the heat within the apparatus from passing to and escaping from the external vessel 11.

The lower end of the conduit 13 is connected to the vapor supply pipes 6 by an annular port 18 in the lower part of the lining or cylinder 12, with which the conduit 13 communicates.

The upper end of the vaporizer is closed by a cover 19 adapted to be readily placed in position and removed. In the construction shown, it is hinged at 20, so that it can be swung on the hinge out of place, so as to expose the interior of the furnace vessel 12. When in place over the vessel 12, the cover may be held in place by any convenient means.

In the cover 19, is an opening 21 for the discharge of gases of combustion from the solid fuel; and upon it there is a gas discharge regulating device 22, adapted to screw up and down on a pin 23; and according to its adjustment so will be the area between the device 22 and the discharge lip of the apertures 21; and so the rate of combustion of the solid fuel, and the temperature of the furnace or fire is controlled or regulated.

The bottom of the vaporizer vessel 11 has a large opening in it, as seen in Fig. 2; and the furnace and vaporizing cylinder 12 rests on an annular ledge provided with an asbestos joint of this vessel 11, the inner edge of which forms the opening; and at the bottom of the cylinder 12 there is a perforated grid or grate 24, suitably supported, upon which the solid fuel in the cylinder 12 rests and burns.

The lower portion of the vessel 11 extends down in the form of a chute 25; and the lower end of this chute is closed by a conical closing plug 26, normally pressed upward by a spring 27, which acts on the head of the rod 28, and normally keeps the cone on its seat. No air enters the chute 25 below, but air is admitted to the furnace and fuel through a hole or holes 30, near the grate 24; and this air is the quantity necessary for retaining the fuel in the cylinder 12 at the degree of temperature required; its control or regulation being effected by the discharge device 22, as above stated. Thus an exact regulation of the rate of combustion, and temperature of furnace is complete, and readily effected.

The device 22 being on the top of the apparatus, access can be readily had to it.

It is to be noted also that the whole vaporizing apparatus or means itself is mounted on the top of the engine 1, by feet 31 on the chute portion 25 of the apparatus.

In the construction of vaporizer shown, escape or relief of vapors from different parts of the length of the vaporizing duct 13 is rendered possible and provided for; so that the vapor generated at one part, say, the upper part, is not compelled to pass through the whole of the duct. This is effected by providing at a plurality of points around the cylinder 12, vertical passages 33—closed at their upper end by plugs 32—which communicate with the annular port 18, and with the conduit 13 by holes 34 provided at intervals along the conduit, as in the manner shown. By this means the vapor from the kerosene flowing through the conduit 13, soon after it is vaporized and has passed through a certain length of the conduit 13, and is in a sufficiently stable condition, can pass directly away to the engine, and does not act upon or interfere with the kerosene and vapor in the succeeding reaches of the conduit 13.

In the case shown, there are assumed to be four cylinders to the motor, and they are supplied with vapor from the apparatus in pairs; namely, for the four cylinders there is one vaporizing apparatus and two vapor supply pipes 6, and two air and vapor supply valvular devices 35 connected with them.

By such an arrangement, one vaporizing apparatus suffices to supply four cylinders of an engine without the liability of the vapor cooling materially and condensing back to the liquid condition, although it may in part condense to the "fog" state, which does not matter.

Regarding this air device 35, it consists of a circularly movable perforated or grid disk 36 fitting in a casing and seat 37, which is similarly perforated, and the apertures of which surround the discharge aperture on which the vapor supply valve 5 is fitted and works. This air for supporting the combustion of the vapor will mix with the vapors and pass into the duct 3 to usual inlet valves of the engine; and these ports being close to engine cylinders, no material condensation or liquefaction of the kerosene vapors as will cause segregation of liquid in these parts and passages will take place.

The valve 5 will be moved off its seat by the minus pressure created by the charge introducing stroke of the piston; it being normally pressed onto its seat by a suitable light spring thus causing the valve 5 to operate as an adjustable non-return valve. If under some circumstances, any liquefied kerosene deposits in the chamber 35 surrounding the valve 5, it will be drained away by a pipe 41, the upper end of which communicates with this chamber by a port 41′.

The disks 36 are adapted to be moved, and the air inlet openings in the casing 37 opened more or less in consequence, by a bar 42, which is connected to them by pins 43, and which can be moved in one direction by a wire 44 or other connection from a suitable place of control or operation; it being normally pulled and moved in the other direction by a spring 45. The limit of movement by the spring, say for a maximum air opening, is effected by an adjustable screw 46 on the end of one of the escape pipe socket fittings of the pipes 41, against which the end of the bar 42 touches when free; while when less air opening is required, the bar will be moved away from this stop by the wire or connection 44. The throttle valves 4 likewise will be operated together by suitable means.

Any ash or residue of the fuel in the vaporizing apparatus 10 which falls into the hopper 25, will pass down into the lower vertical tubular part of it, and can be discharged from it when desired by simply depressing the upper end of the rod 28; it being closed afterward by the spring 27.

The exhaust chambers and passages of the cylinders are marked 8.

What is claimed is:—

1. In combination, a power driven body, an internal combustion engine mounted on said body, a container adapted to hold and burn solid fuel; a conduit or chamber heated by and surrounding said container, said conduit or chamber adapted to have introduced into it hydro-carbon liquid fuel and to vaporize said liquid fuel by heat of combustion of said solid fuel; and a conduit connecting said vaporizing conduit or chamber with the cylinder of the engine; substantially as set forth.

2. In combination, a power driven body, an internal combustion engine mounted on said body, a container adapted to hold and burn solid fuel; a conduit or chamber outside and in contact with the fuel in the container adapted to have introduced into it hydro-carbon liquid fuel; and a conduit connecting said conduit or chamber with the cylinder of the engine; substantially as set forth.

3. In combination, an internal combustion engine, a container adapted to hold and burn solid fuel, a conduit heated by said fuel and adapted to have introduced there into hydro-carbon liquid fuel whereby said liquid fuel is vaporized in said conduit by the heat of combustion of the solid fuel, an annular port below said conduit and in communication with the cylinder of the engine, and a passage communicating with said port and having a plurality of communications with said conduit, whereby the vaporized fuel may be led through said passage and annular port to the engine cylinder from a plurality of points of said conduit.

4. In an internal combustion engine, a container adapted to hold and burn solid fuel; a metal liner within the container, against the wall of which solid fuel rests, and having a conduit for vaporizing the liquid fuel formed in said liner and means for conducting the vaporized fuel to the cylinder of the engine; substantially as set forth.

5. In an internal combustion engine, a container adapted to hold and burn solid fuel; a conduit in the container of continuous form, outside the fuel for vaporizing a hydro-carbon liquid, and having passages at different points of the same for passing the vapors produced at different points of the conduit to the engine cylinder or cylinders direct; substantially as set forth.

6. In an internal combustion engine, a container adapted to hold and burn solid fuel; a conduit in the container of continuous form, outside the fuel for vaporizing a hydro-carbon liquid, and having passages at different points of the same for passing the vapors produced at different points of the conduit to the engine cylinder or cylinders direct; and wherein the latter parts of the conduit are in communication with the earlier parts of same at different points of its length by ports or passages; substantially as set forth.

7. In an internal combustion engine, the combination with the cylinder of a liquid fuel vaporizing appliance having an internal solid fuel containing chamber, a grate at the bottom of same, a regulated gas discharge opening, a receiver for the solid burnt residue below the grate, an oil evaporating chamber or conduit, and vapor conduits leading from the lowest point of the evaporating chamber and connected with the inlet for combustible fluid to the cylinders; substantially as set forth.

8. In an internal combustion engine, the combination of a vaporizer comprising a cylinder having an open bottom, a valve for controlling the opening in the bottom, a valve in the top of the cylinder, a grate in the open bottom, to receive fuel, a liner in the cylinder, said liner having a spiral groove on its outer surface which with the cylinder forms a vaporizing conduit, means controlled by the engine for supplying the conduit with a regulatable supply of liquid fuel, ducts leading from the lower end of the conduit to the cylinders of the engine, and automatic air inlet valves in said ducts.

9. In an internal combustion engine, the combination of a vaporizer comprising a cylinder, a grate in the bottom of the cylinder to support solid fuel, a liner in the cylinder and defining a solid fuel chamber, said liner having a spiral conduit therein and vertical passages connected by ducts with the spiral conduit, means for admitting a regulatable supply of liquid fuel to the spiral conduit, a valve for controlling the gas escaping from the solid fuel, and ducts leading from the lower end of the spiral conduit to connect with the cylinders of the engine.

10. In an internal combustion engine, the combination of a vaporizer comprising a container, a grate in the bottom of the container, a liner within the container, said liner having on its outer surface a spiral groove communicating with a passage at the bottom of the container, said liner having vertical passages inside the vertical plane of the spiral groove, and communicating with the passage in the bottom of the container, said vertical passages being connected to the spiral groove by short ducts formed in the liner, an asbestos strip interposed between the liner and the container, means for supplying a regulatable supply of liquid fuel to the upper end of the spiral groove, ducts leading from the passage at the bottom of the container to the engine cylinders, and automatic valves in said ducts to admit air to the vaporized mixture.

11. A hydro-carbon liquid fuel internal combustion engine comprising in combination an engine cylinder; a liquid fuel supply conduit; a vaporizing apparatus adapted to be heated, and the liquid vaporized, by a source of heat other than that produced by the engine, and consisting of a container adapted to receive and hold solid fuel, and such fuel to be burned by air therein; and a conduit in said apparatus heated by the heat of combustion of the fuel, into which conduit the liquid is introduced, and in which it is vaporized.

12. A hydro-carbon liquid fuel internal combustion engine comprising in combination an oil supply conduit, a vaporizing conduit down which the oil is adapted to flow without filling the same, and through which the gas vaporized therefrom is adapted to pass; a container adapted to hold and burn solid fuel, and to heat the said oil vaporizing conduit; an engine cylinder; and a conduit communicating with a lower portion of the said oil vaporizing conduit, and the said cylinder.

13. A liquid fuel boiling or evaporating apparatus for internal combustion engines comprising a metal vessel adapted to receive internally solid fuel to burn same therein, an inclined conduit on the outside of said vessel and heated by the heat of the combustion of the solid fuel in the vessel, a duct on the outside of the vessel adapted to deliver liquid fuel on to the upper surface of the upper part of the inclined conduit, and means for supplying a fluid to the vaporized fluid conduit at a point removed from the point of introduction of the fuel to the surface of the conduit, whereby the liquid fuel delivery on to the actual upper surface of the conduit is not interfered with by the previously delivered fuel.

14. A liquid fuel boiling or evaporating apparatus for internal combustion engines comprising a metal cylinder or wall adapted to receive internally solid fuel and to burn same therein, an inclined conduit on the outside of said vessel, heated by the heat of the combustion of the solid fuel in the vessel, a duct on the outside of the vessel adapted to deliver liquid fuel on to the upper surface of the upper part of the inclined conduit, and means for supplying liquid fuel to the vaporized fluid conduit at a point removed from the point of introduction of the fuel to the surface of the conduit and a discharge conduit for mixed fluid and fuel vapor at the lower part of the inclined conduit downward toward which both the fluid and the vapor flow.

15. In combination, an internal combustion engine, a liquid fuel feeding device, an oil vaporizing apparatus below said device having a vaporizing conduit adapted to be heated, said conduit being adapted to receive hydro-carbon liquid fuel from the feeding device and to permit the flow of said fuel in said conduit by gravity, a conduit extending between the vaporizing conduit and the engine cylinder, a controlling device in said conduit, whereby the degree of vacuum within the vaporizing conduit as produced by the suction of the engine is controlled, the vacuum thus produced acting upon the liquid fuel in the feeding device, whereby the quantity of fuel passing from the feed device into the vaporizing conduit is directly proportional to the degree of vacuum produced by the engine between the controlling device and the vaporizing conduit.

In testimony whereof I have signed my name to this specification in the presence of two subscribing witnesses.

PERCY OCTAVIUS ROWLANDS.

Witnesses:

SOMERVILLE GOODALL,

ALICE PERKINS.